US012657794B2

(12) United States Patent
Sugahara

(10) Patent No.: US 12,657,794 B2
(45) Date of Patent: Jun. 16, 2026

(54) IMAGE DISPLAY CONTROL DEVICE, TERMINAL, IMAGE DISPLAY METHOD, PROGRAM, AND STORAGE MEDIUM

(71) Applicant: FUJIFILM Corporation, Tokyo (JP)

(72) Inventor: Mayuko Sugahara, Saitama (JP)

(73) Assignee: FUJIFILM Corporation, Tokyo (JP)

(*) Notice: Subject to any disclaimer, the term of this patent is extended or adjusted under 35 U.S.C. 154(b) by 162 days.

(21) Appl. No.: 18/585,301

(22) Filed: Feb. 23, 2024

(65) Prior Publication Data

US 2024/0265600 A1     Aug. 8, 2024

(30) Foreign Application Priority Data

Feb. 28, 2023     (JP) ................................. 2023-029941

(51) Int. Cl.
*G06F 3/0346*          (2013.01)
*G06T 3/20*            (2006.01)
*G06T 11/60*           (2006.01)

(52) U.S. Cl.
CPC ............ *G06T 11/60* (2013.01); *G06F 3/0346* (2013.01); *G06T 3/20* (2013.01)

(58) Field of Classification Search
None
See application file for complete search history.

(56) References Cited

U.S. PATENT DOCUMENTS

2003/0142144 A1* 7/2003 Balakrishnan .......... G06F 3/033
                                                        715/848
2006/0031786 A1* 2/2006 Hillis .................. G06F 3/04883
                                                        715/863

2009/0289924 A1* 11/2009 Takata .................. G06F 3/0481
                                                         345/184
2010/0169817 A1* 7/2010 Want .................... G06F 3/04817
                                                         715/772
2011/0193788 A1* 8/2011 King ....................... G06F 3/017
                                                         345/173

(Continued)

FOREIGN PATENT DOCUMENTS

JP      2019-083048 A      5/2019

OTHER PUBLICATIONS

The extended European report issued by the European Patent Office on Jul. 8, 2024, which corresponds to European Patent Application No. 24159912.5-1218 and is related to U.S. Appl. No. 18/585,301.

(Continued)

*Primary Examiner* — David H Chu
(74) *Attorney, Agent, or Firm* — Studebaker Brackett PLLC

(57)          ABSTRACT

Provided are an image display control device, a terminal, an image display method, a program, and a storage medium capable of easily changing a placement position of an image in a screen.

An image display control device according to an embodiment of the present invention executes: acquisition processing of acquiring first information about a motion of a terminal; and movement processing of moving a display position of an image, during a second period corresponding to a first period in which second information significant to the motion is acquired, on the basis of the acquired second information. The second period ends after a lapse of a predetermined time from end of the first period.

28 Claims, 11 Drawing Sheets

(56)     References Cited

U.S. PATENT DOCUMENTS

| | | | |
|---|---|---|---|
| 2014/0149903 A1* | 5/2014 | Ahn ...................... | G06F 3/0484 |
| | | | 715/765 |
| 2018/0104573 A1* | 4/2018 | Jeffery ................... | G06F 3/017 |
| 2019/0121443 A1* | 4/2019 | Lee ....................... | G06F 3/0346 |
| 2021/0208698 A1* | 7/2021 | Martin ................... | G06F 3/012 |

OTHER PUBLICATIONS

Ira's World: "Move icons With Gravity Amazing Tweak For Your iPhone!! Gravitation Tweak For iPhone(ios)"; Apr. 30, 2020; XP093175810; Retrieved from the Internet: URL:https://www.youtube.com/watch?v=qXg81gyMPvE [retrieved on Jun. 18, 2024].

* cited by examiner

START OF MAIN IMAGE DISPLAY FLOW

ACQUIRE IMAGE — S001

SET MOVEMENT CONDITION — S002

SET PLACEMENT CONDITION — S003

DISPLAY IMAGE ON PREVIOUS SCREEN — S004

RECEIVE INPUT OF ACCELERATION — S005

MOVE IMAGE WITHIN PRESENTMENT SCREEN — S006

DISPLAY IMAGE ON SUBSEQUENT SCREEN — S007

END OF MAIN IMAGE DISPLAY FLOW

IMAGE DISPLAY CONTROL DEVICE, TERMINAL, IMAGE DISPLAY METHOD, PROGRAM, AND STORAGE MEDIUM

CROSS-REFERENCE TO RELATED APPLICATIONS

The present application claims priority under 35 U.S.C. § 119 to Japanese Patent Application No. 2023-029941, filed on Feb. 28, 2023. The above application is hereby expressly incorporated by reference, in its entirety, into the present application.

BACKGROUND OF THE INVENTION

1. Field of the Invention

An embodiment of the present invention relates to an image display control device, a terminal, an image display method, a program, and a storage medium.

2. Description of the Related Art

A technique for changing a placement position of an image displayed on a screen of an image display control device has already been developed, and a technique disclosed in JP2019-83048A is given as an example.

In the technique described in JP2019-83048A, in a state where an image group is regularly placed on a screen of a mobile terminal, a user shakes the mobile terminal such that the placement positions of adjacent images among the images in the image group are switched. Thereby, it is possible to easily change the placement positions of the images without operating the screen of the mobile terminal.

SUMMARY OF THE INVENTION

As in the technique disclosed in JP2019-83048A, in a case where the placement positions of the adjacent images are switched at substantially the same time as a timing at which the user ends the shake of the mobile terminal, it is difficult to detect whether or not the placement position is changed.

An embodiment of the present invention has been made in view of the above-mentioned circumstances, and an object thereof is to provide an image display control device, a terminal, an image display method, a program, a storage medium capable of easily changing a placement position of an image in a screen.

In order to achieve the above-mentioned object, according to an aspect of the present invention, there is provided an image display control device executing: acquisition processing of acquiring first information about a motion of a terminal; and movement processing of moving a display position of an image, during a second period corresponding to a first period in which second information significant to the motion is acquired, on the basis of the acquired second information. The second period ends after a lapse of a predetermined time from end of the first period.

Further, a period, in which the display position of the image is moved, may be the second period.

Further, the predetermined time may be a time after a processing sequence ends.

Further, the movement processing may be executed such that the second period starts after a start time point of the first period.

Further, the second period may overlap with at least a part of the first period.

Further, a form of the movement processing may be changed on the basis of the first information.

Further, the movement processing may be executed such that the image is moved in a direction away from a predetermined position after the image is moved toward the predetermined position on a screen and reaches the predetermined position.

Further, a length of the second period may be set on the basis of the first information.

Further, a length of the second period may be set in accordance with a length of the first period.

Further, the number of times of movement in a case where the image is intermittently moved during the second period may be set in accordance with the number of inputs of the first information which is input during the first period.

Further, a movement direction, in which the image is moved during the second period, may be set in accordance with an inclined angle of the terminal with respect to a horizontal direction, where the inclined angle is calculated on the basis of input of the first information depending on a posture of the terminal.

Further, a movement condition in a case of moving the image may be set in accordance with a size of the first information.

Further, a moving distance of the image in a case where a size of the first information is greater than a set value may be reduced to be less than a moving distance of the image in a case where the size of the first information is equal to or less than the set value.

Further, processing of performing image analysis on a plurality of images may be further executed. Furthermore, in the movement processing, on the basis of analysis information of the images, each of the plurality of images may be moved such that each of the plurality of images is placed along a first placement shape corresponding to the analysis information.

Further, after each of the plurality of images is placed along the first placement shape, in a case where input of the first information is received in the acquisition processing, in the movement processing, on the basis of the analysis information, each of the plurality of images may be moved such that each of the plurality of images placed along the first placement shape is placed along a second placement shape.

Further, processing of acquiring accessory information associated with each of a plurality of images may be further executed. Furthermore, in the movement processing, on the basis of the acquired accessory information, each of the plurality of images may be moved such that each of the plurality of images is placed along a third placement shape corresponding to the accessory information.

Further, processing of receiving input information of a user may be further executed. Furthermore, in the movement processing, each of a plurality of images may be moved such that each of the plurality of images is placed along a fourth placement shape corresponding to the input information.

Further, processing of performing image analysis on each of a plurality of images may be further executed. Furthermore, calculation processing of calculating a degree of similarity of each of the plurality of images on the basis of analysis information of the image may be further executed. In addition, in the movement processing, the plurality of images may be moved such that first images exceeding a first reference value relating to the degree of similarity among the plurality of images are close to each other.

Further, in a case where input of the first information is received after the first images among the plurality of images are placed close to each other, in the movement processing, on the basis of a second reference value of which the degree of similarity is higher than the first reference value, the plurality of images may be moved such that second images exceeding the second reference value among the plurality of first images are further close to each other.

Further, processing of acquiring accessory information associated with each of a plurality of images may be further executed. Furthermore, calculation processing of calculating a degree of similarity of each of the plurality of images on the basis of the acquired accessory information may be further executed. In addition, in the movement processing, the plurality of images may be moved such that first images exceeding a first reference value relating to the degree of similarity among the plurality of images are close to each other.

Further, processing of receiving input information of a user may be further executed. Furthermore, calculation processing of calculating a degree of similarity of each of a plurality of images on the basis of the input information may be further executed. In addition, in the movement processing, the plurality of images may be moved such that first images exceeding a first reference value relating to the degree of similarity among the plurality of images are close to each other.

Further, a plurality of images may be displayed to be placed in a random manner in a screen.

Further, a plurality of images may be displayed to be placed in a regular manner in a screen.

Further, display processing of displaying a plurality of images placed in one of a regular manner or a random manner in a screen may be further executed. Furthermore, in a case where input of the first information is received in the acquisition processing, in the movement processing, each of the plurality of images may be moved such that the plurality of images are placed in the other of the regular manner or the random manner.

Further, in a case where input of the first information is received, each of a plurality of images is moved such that vertically relative positions of the images may be changed.

Further, according to an embodiment of the present invention, it is possible to realize a terminal including the image display control device described above.

Further, in order to solve the above-mentioned problems, according to an aspect of the present invention, there is provided an image display method causing a processor to execute: acquisition processing of acquiring first information about a motion of a terminal; and movement processing of moving a display position of an image, during a second period corresponding to a first period in which second information significant to the motion is acquired, on the basis of the acquired second information. The second period ends after a lapse of a predetermined time from end of the first period.

Further, according to the embodiment of the present invention, it is possible to realize a program causing a computer to execute each processing included in the above-mentioned image display method.

Further, according to the embodiment of the present invention, it is possible to realize a computer-readable storage medium storing a program recorded thereon causing a computer to execute each processing included in the above-mentioned image display method.

According to the embodiment of the present invention, it is possible to provide an image display control device, a terminal, an image display method, a program and a storage medium capable of easily changing a placement position of an image in a screen.

DESCRIPTION OF THE PREFERRED EMBODIMENTS

A specific embodiment of the present invention will be described, with reference to the drawings. However, the embodiment described below is merely an example for ease of understanding of the present invention, and is not intended to limit the present invention. Moreover, the present invention can be changed or improved from the embodiment described below without departing from the gist of the present invention. Moreover, the present invention includes its equivalents.

In the present specification, the concept of "apparatus" includes a single apparatus that exerts a specific function in one apparatus, and includes a combination of a plurality of apparatuses that are distributed and present independently of each other and exert a specific function in cooperation (coordination) with each other.

In the present specification, an "image" is defined as image data unless otherwise specified. The image data corresponds to, for example, lossy compressed image data, such as joint Photographic Experts Group (JPEG) format, and lossless compressed image data, such as Graphics Interchange Format (GIF) or Portable Network Graphics (PNG) format, moving image data which is configured by using a plurality of frame images, or the like. Further, the image data may include accessory information representing a file name, an imaging date and time, an imaging location, and the like.

Further, in the present specification, the "user" is a user who uses the image display device according to the embodiment of the present invention. The meaning of using the image display device is to use a function of the image display device, and includes to directly operate the image display device, and to use the function of the image display device via a device (for example, a user terminal) that can communicate with the image display device.

Regarding Brief Overview of One Embodiment of Present Invention

Figure 1:
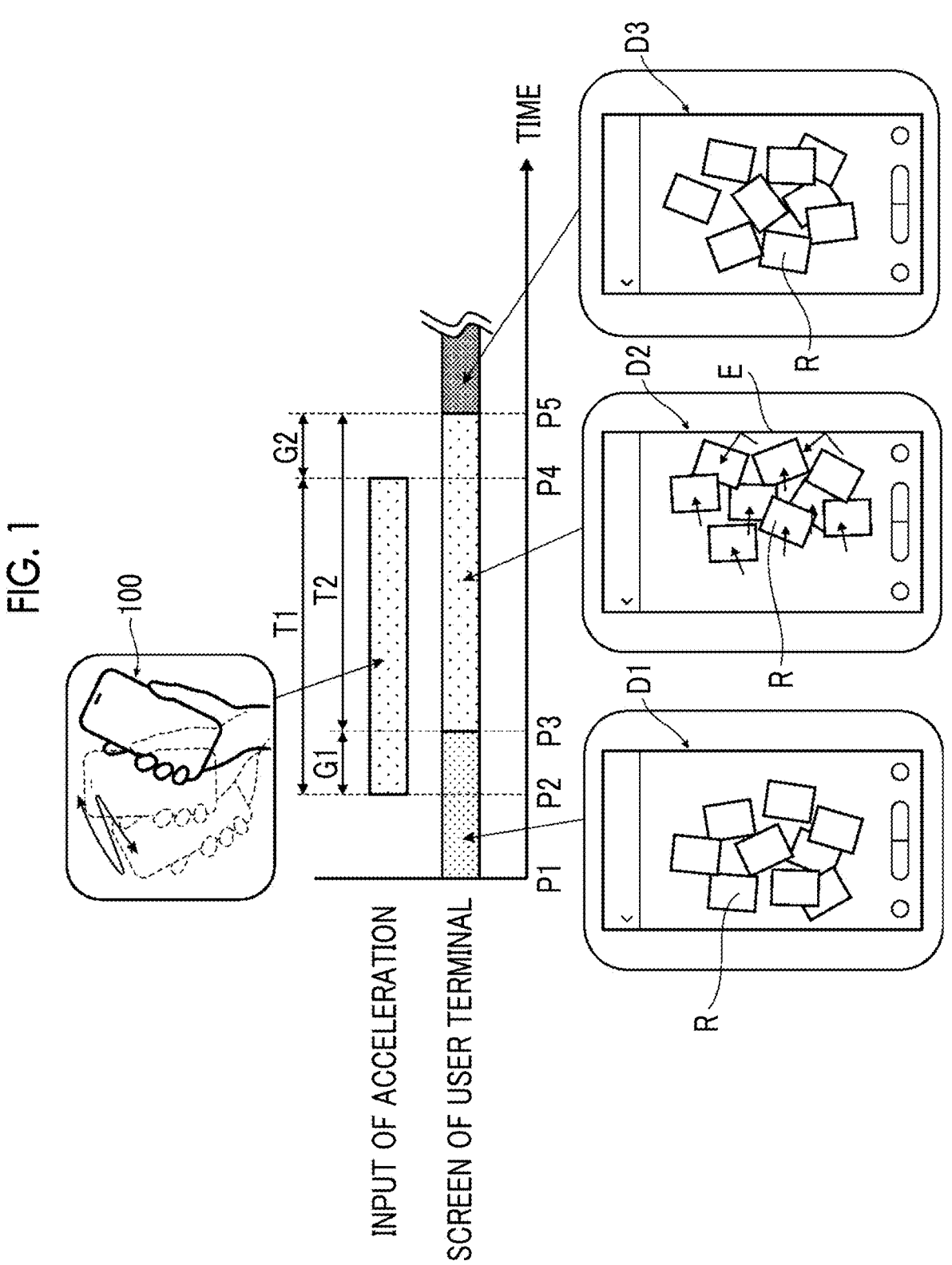
FIG. 1 is a diagram showing a brief overview of an example of transition of a screen of an image display device according to an embodiment of the present invention.

Image display (hereinafter, main image display), which is performed using the image display control device and the image display method according to the embodiment of the present invention, will be described with reference to FIG. 1. The example shown in FIG. 1 is an example of a main image display.

In the following description, the image display control device will be referred to as "image display device" for convenience.

An image display device (hereinafter, "image display device 10") will be described as an image display device included in a terminal (hereinafter, "user terminal 100").

The user terminal 100 is a computer used by the user, and specifically, includes a smart device such as a smartphone, a tablet terminal, a laptop personal computer (PC), or the like.

In the main image display, as shown in FIG. 1, presentment is performed in which each image R of the image group displayed on a presentment screen D2 of the user terminal 100 is moved within the presentment screen D2. Specifically, in a case where the user performs a reciprocating operation of shaking the user terminal 100 in a reciprocation direction, each image R moves within the presentment screen D2.

To describe the main image display more specifically, in a case of using the main image display, the user downloads an image display application program (hereinafter, an image display application) from a predetermined site and installs the program on the user terminal 100. In a case where the user is authenticated, the screen of the user terminal 100 switches to a top screen (not shown in the drawing). Thereafter, the user performs various screen operations, and thus the screen of the user terminal 100 transitions from the top screen (not shown in the drawing) to a previous screen D1. A transition time point to the previous screen D1 is indicated by P1 (refer to FIG. 1). It should be noted that the "previous screen D1" means a screen before (previous to) the presentment screen D2.

For example, image groups are randomly placed on the previous screen D1. The term "randomly" means a state where the images R constituting the image group are irregularly placed.

In addition, the "image R" is an image saved in the user terminal 100, and is, for example, an image captured by the user in the past or an image acquired by the user in the past through the Internet or the like. Alternatively, the image R may be an image saved in a cloud-type server prepared by a company or the like that provides a service of the main image display. In such a case, the image R saved in association with the user information is acquired from the cloud-type server through the image display application, and the image R is displayed on the previous screen D1.

Further, the image R may be, for example, a "photographic image" obtained by capturing a photograph printed by a printer. However, the image R is not limited to a photographic image. For example the image R corresponds to, regardless of display content, any image of an image obtained by imaging a subject or a landscape in a real space, a virtual image obtained by performing imaging in a pseudo manner within a virtual space such as virtual photography, and the like.

Next, in a state where the previous screen D1 is displayed, the user performs a reciprocating operation of shaking the user terminal 100 in the reciprocation direction. Thereby, an acceleration (first information) relating to the motion (amount of movement and a movement direction) of the user terminal 100 (terminal) is input to the image display device 10. More specifically, the user terminal 100 includes a sensor 25 (refer to FIG. 2) capable of detecting an acceleration. The sensor 25 outputs data, which corresponds to the acceleration of the user terminal 100, in accordance with the reciprocating operation of the user terminal 100. This output data is data, which indicates a magnitude of the acceleration and a direction of the acceleration, and is input to the image display device 10 provided in the user terminal 100. In addition, a period, in which the acceleration is input to the image display device 10, is referred to as a first period T1, and a start time point of the first period T1 is indicated by P2 (refer to FIG. 1). In other words, the second information significant to the motion of the user terminal 100 is acquired during the first period T1. The second information is one or both of physical information and signal information (for example, the output data described above).

In addition, the first period T1 includes a time required for the processing sequence in addition to a time during which the user is actually shaking the user terminal 100.

The "processing sequence" includes communication processing, which is performed in a case of communicating the output data from the sensor 25 to the image display device 10, and each processing, which is performed by the image display device 10 in order to reflect the information of the output data in the display position of the image R, after the user terminal 100 is shaken. The "time required for the processing sequence" is a time which is required for performing the processing. Consequently, a time lag occurs from a time point at which the user actually shakes the user terminal 100 to a time point at which the processing sequence ends. The end time point of the first period T1 (end time point P4 to be described later) means a time point at which the processing sequence ends.

After a period G1, the screen of the user terminal 100 transitions from the previous screen D1 to the presentment screen D2 with a delay to a start time point P2 of the first period T1. The period G1 is a period from a time point at which the input of the acceleration is started to a time point at which the screen transitions to the presentment screen D2, in other words, a period from the start time point P2 of the first period T1 to the start time point P3 of the second period T2 to be described later.

It should be noted that the second period T2 may be set to start at the same time as the start time point P2 of the first period T1.

In a case where the screen transitions to the presentment screen D2, presentment is performed in which the image R displayed at that time point is moved within the presentment screen D2 during the second period T2 corresponding to the first period T1. The second period T2 starts after the start time point P2 of the first period T1. Hereinafter, the start time point of the second period T2 will be indicated by P3. During the second period T2, the display position of the image R is moved on the basis of the acquired second information. That is, a period, in which the display position of the image R is moved, is the second period T2.

A length of the second period T2 is determined in accordance with the length of the first period T1. In the present example, the lengths of both periods are the same. It should be noted that the lengths of both periods may be different from each other. The second period T2 may be obtained by adding a predetermined period to the first period T1, or may be obtained by multiplying the first period T1 by a predetermined coefficient. Further, the length of the second period T2 may be set on the basis of the acceleration (first information).

In the presentment on the presentment screen D2, the image R moves within the presentment screen D2. More specifically, the image R is moved in the same direction as the input acceleration or in a direction corresponding to the direction of the input of the acceleration. That is, the image R is moved within the presentment screen D2 in conjunction with the operation of the user shaking the user terminal 100. Such presentment is executed by using a well-known image processing technique for moving the image R within the presentment screen D2, specifically, an image processing technique for animation displaying.

In the present example, the image R continuously moves within the presentment screen D2 without being stopped during the second period T2.

On the other hand, the image R may be intermittently moved within the presentment screen D2 by repeating movement and stop during the second period T2. For example, the image R may be intermittently moved during the second period T2 in accordance with the number of inputs of the input acceleration during the first period T1. Regarding the "number of inputs of acceleration", for example, the input of acceleration, which corresponds to one reciprocation in a case where the reciprocating operation of shaking the user terminal 100 in the reciprocation direction is repeated, may be counted as one input. Alternatively, a half of one reciprocation thereof, that is, the input of acceleration corresponding to one operation in the forward direction or the backward direction may be counted as one input. Consequently, the "number of inputs of the acceleration" may be the number of times the acceleration direction changes. Similarly, the "number of times of movement of the image R" may be the number of times the movement direction of the image R changes. It should be noted that the number of times of the movement of the image R may be the same as or different from the number of inputs of the acceleration to the user terminal 100.

In the presentment on the presentment screen D2, the image R moves within the presentment screen D2 in accordance with the direction of the input acceleration. The direction, in which the image R is moved, may be the same as the direction of the input acceleration. For example, in a case of the input of the acceleration in the horizontal direction of the presentment screen D2 in the direction along the front face of the user terminal 100 on which the screen is formed, the image R may be moved in the horizontal direction of the presentment screen D2.

However, the direction of the input acceleration and the direction, in which the image R is moved, do not have to be the same. For example, in a case where acceleration components in a vertical direction and a horizontal direction orthogonal to each other are compared among directions along the front face of the user terminal 100 on which the screen is formed, the image R may be moved in a direction toward a larger side. More specifically, accelerations having respective components of the vertical direction and the horizontal direction may be input. In such a case, for example, in a case where an acceleration component in the horizontal direction is greater than an acceleration component in the vertical direction, the image R may be moved in the horizontal direction.

The image R, which starts to be moved in accordance with the direction of the input acceleration, is moved toward a predetermined position on the presentment screen D2. Specifically, the predetermined position on the presentment screen D2 is a predetermined position in the outer frame E surrounding the presentment screen D2. It should be noted that the predetermined position is a position of intersection between the outer frame E and a virtual line extending from the placement position of the image R in the direction of the input of the acceleration.

The image R reaches the predetermined position and then moves in a direction away from the predetermined position. Consequently, the movement direction of the image R is changed from a direction from the inside of the presentment screen D2 toward the outer frame E to a direction from the outer frame E toward the inside of the presentment screen D2. Thereafter, whenever the image R reaches the outer frame E, the movement direction of the image R is repeatedly changed.

Thereafter, a period, in which the first period T1 and the second period T2 overlap with each other, continues. That is, the second period T2 overlaps with at least a part of the first period T1. Here, from the viewpoint of the presentment content, the description that the second period T2 overlaps with the first period T1 means that the image R continues to move on the presentment screen D2 while the input of the acceleration continues.

Thereafter, the user stops the reciprocating operation on the user terminal 100. Therefore, the first period T1, in which the acceleration is input to the user terminal 100, ends. The end time point of the first period T1 is indicated by P4.

On the other hand, the presentment using the presentment screen D2 is continued even after the end time point P4 of the first period T1. Then, an end time point P5 of the second period T2 is reached after a lapse of a period G2 (predetermined time) from the end time point P4 of the first period T1. That is, the second period T2 ends after the lapse of the predetermined time from the end time point P4 of the first period T1. The "predetermined time" is a time after the processing sequence ends, that is, after the end time point P4 of the first period T1.

It should be noted that, although the second period T2 overlaps with at least a part of the first period T1, the technique of the present disclosure is not limited thereto. The second period T2 does not have to overlap with the first period T1. In such a case, the start time point P3 of the second period T2 is positioned after the end time point P4 of the first period T1. In other words, the second period T2 starts after a lapse of a certain period from the end time point P4 of the first period T1. Thereby, after the input of the acceleration to the user terminal 100 ends, the screen of the user terminal 100 switches to the presentment screen D2 after a lapse of a certain period of time.

In a case where the end time point P5 of the second period T2 is reached, the screen of the user terminal 100 transitions from the presentment screen D2 to a subsequent screen D3. It should be noted that the "subsequent screen D3" means a screen after (subsequent to) the presentment screen D2.

An image group, which has the same placement as that at the end time point of the presentment on the presentment screen D2, is displayed on the subsequent screen D3. In the present example, the image group is randomly placed on the subsequent screen D3 such that the image group is different from the placement of the image group displayed on the previous screen D1.

As described above, in the main image display, the second period T2, in which the presentment is performed on the presentment screen D2, ends after the end time point P4 of the first period T1 in which the acceleration is input. Thereby, the user is able to enjoy the presentment on the presentment screen D2 during the period G2 between the end time point P4 of the first period T1 and the end time point P5 of the second period T2. Consequently, even after the user ends the shake of the mobile terminal, the user is able to enjoy the presentment in which the image R moves due to inertia (vis inertiae) as an afterglow.

Regarding Configuration Example of Image Display Device According to One Embodiment of Present Invention A configuration of the image display device 10 according to the embodiment of the present invention will be described with reference to FIG. 2.

The image display device 10 is configured as a part of the user terminal 100.

Specifically, the user terminal 100 includes a smart device such as a smartphone, a tablet terminal, or a laptop personal computer (PC).

Figure 2:
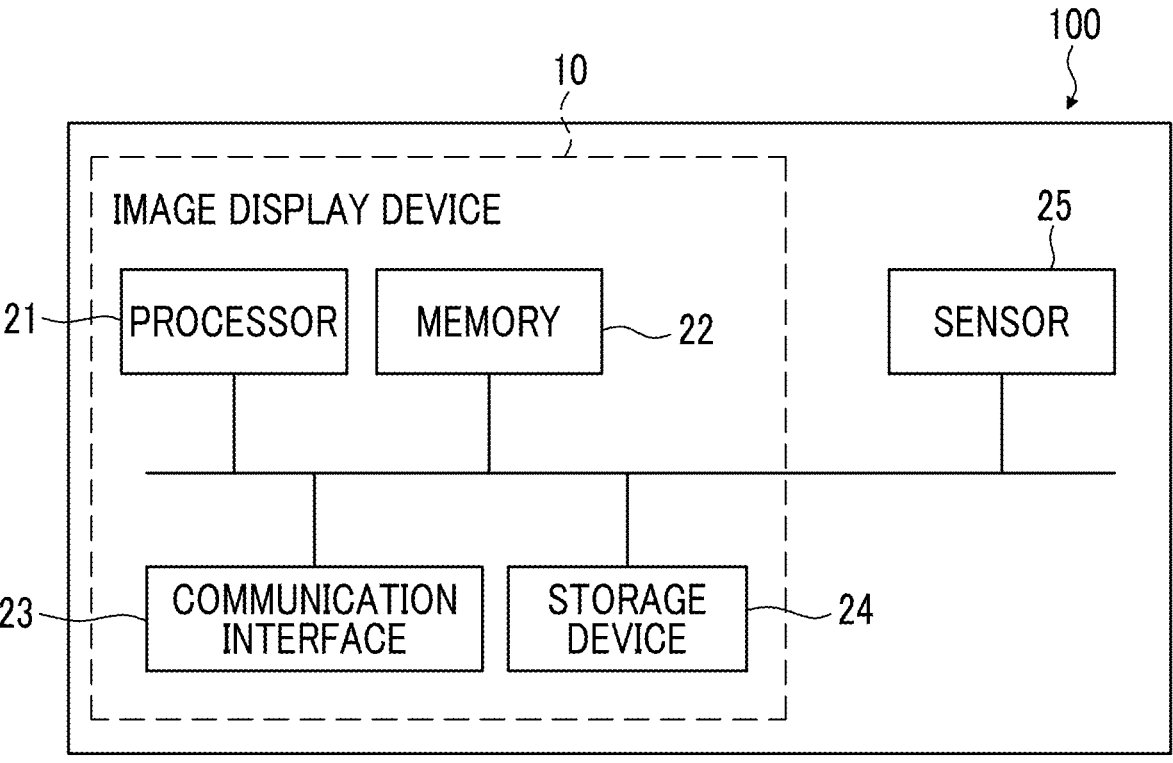
FIG. 2 is a diagram showing a configuration example of the image display device according to the embodiment of the present invention.
Figure 3:
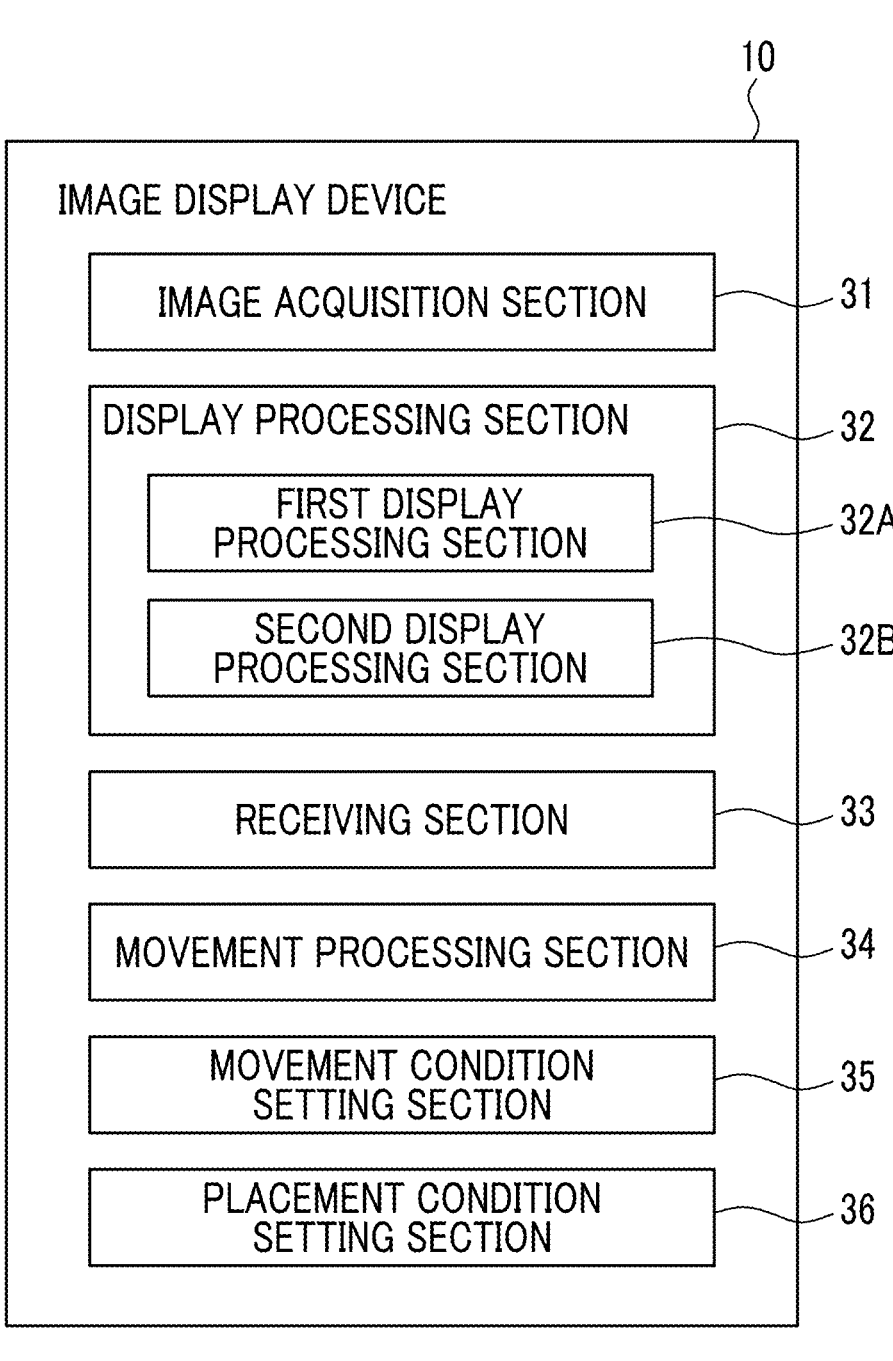
FIG. 3 is an explanatory diagram of a function of the image display device according to the embodiment of the present invention.

The image display device 10 is formed of a computer, and has a processor 21, a memory 22, a communication interface 23, and a storage device 24, as shown in FIG. 2.

The processor 21 is configured by using, for example, a central processing unit (CPU), a micro-processing unit (MPU), a micro controller unit (MCU), a graphics processing unit (GPU), a digital signal processor (DSP), a tensor processing unit (TPU), an application specific integrated circuit (ASIC), or the like.

The memory 22 is configured by using, for example, a semiconductor memory, such as a read only memory (ROM) and a random access memory (RAM).

The communication interface 23 may be configured by using, for example, a network interface card or a communication interface board. The computer constituting the image display device 10 is able to communicate with another device connected to the Internet, a mobile communication line, or the like via the communication interface 23.

The storage device 24 is configured by using, for example, a flash memory, a hard disc drive (HDD), a solid state drive (SSD), a flexible disc (FD), a magneto-optical disc (MO disc), a compact disc (CD), a digital versatile disc (DVD), a secure digital card (SD card), a universal serial bus memory (USB memory), or the like.

The user terminal 100 further includes the sensor 25.

The sensor 25 is, for example, an acceleration sensor or a gyro sensor, and outputs an electric signal (output signal) according to acceleration. More specifically, the sensor 25 outputs a data signal which indicates the respective accelerations in the three directions orthogonal to one another. In the example of FIG. 1, the sensor 25 outputs an acceleration between two directions orthogonal to each other among the directions along the front face of the user terminal 100 on which the screen is formed, specifically, an acceleration between the vertical direction and the horizontal direction and a direction orthogonal to the front face. The acceleration data, which is output from the sensor 25, is input to the image display device 10.

Regarding Functions of Image Display Device According to One Embodiment of Present Invention Next, a configuration of the image display device 10 according to an embodiment of the present invention will be described again from a functional aspect. As shown in FIG.

3, the image display device 10 has an image acquisition section 31, a display processing section 32, a receiving section 33, a movement processing section 34, a movement condition setting section 35, and a placement condition setting section 36.

These functional sections are implemented by the cooperation between the hardware device included in the computer constituting the image display device 10 and the program (that is, software) installed in the computer.

Hereinafter, each functional section will be described.

Image Acquisition Section

The image acquisition section 31 executes acquisition processing of acquiring one or the plurality of images R used for presentment of the main image display from the image group which is stored in the storage device 24. Alternatively, the image acquisition section 31 may execute acquisition processing of acquiring one or the plurality of images R used for presentment of the main image display from the image group that is saved in the cloud-type server (not shown in the drawing) and that is associated with the user information.

The image acquisition section 31 may determine the number of images R to be acquired, for example, with a preset set value as an upper limit. The set value may be automatically set to a suitable number in a case of performing presentment on the presentment screen D2, or may be set by the user.

Further, the set value may be changed whenever the main image display is performed, or may be set in accordance with specifications and performance of the user terminal 100 (image display device 10).

Display Processing Section

The display processing section 32 executes display processing of displaying the images R on the screen of the user terminal 100. More specifically, the display processing section 32 has functions of a first display processing section 32A and a second display processing section 32B. The first display processing section 32A displays one or the plurality of images R on the previous screen D1. In such a case, the first display processing section 32A places the image R in the previous screen D1 on the basis of the placement condition which is set by the placement condition setting section 36 to be described later. The second display processing section 32B displays one or the plurality of images R on the subsequent screen D3. In such a case, the second display processing section 32B places the image R in the subsequent screen D3 on the basis of the placement condition which is set by the placement condition setting section 36 to be described later.

Receiving Section

The receiving section 33 executes reception processing of receiving the input of the acceleration to the user terminal 100. In other words, the receiving section 33 executes acquisition processing of acquiring the acceleration relating to the motion of the user terminal 100. More specifically, the receiving section 33 receives an output signal corresponding to the acceleration, which is output from the sensor 25 in a case where the user terminal 100 is shaken. In the present example, the receiving section 33 receives an output signal corresponding to an acceleration in each of two directions, specifically, the vertical and horizontal directions, which are orthogonal to each other among directions along the front face of the user terminal 100 on which the screen is formed, and the direction orthogonal to the front face.

Movement Processing Section

The movement processing section 34 executes movement processing of moving one or the plurality of images R within the presentment screen D2 in accordance with the direction of the input acceleration during the second period T2 corresponding to the first period T1 in which the acceleration is input. In other words, the movement processing section 34 moves the display position of the image R on the basis of the output data (second information) acquired acceleration during the second period T2 corresponding to the first period T1 in which the second information significant to the motion of the user terminal 100 is acquired. The movement processing section 34 may change a form of the movement processing on the basis of the acceleration (first information). The "form of the movement processing" means, for example, the movement condition and the like to be described later.

The movement processing section 34 moves the image R within the presentment screen D2 using a well-known image processing technique, specifically, an image processing technique for animation displaying. The movement processing section 34 moves the image R within the presentment screen D2 on the basis of the movement condition of the image R which is set by the movement condition setting section 35 to be described later. It should be noted that a placement position of the image R at the start time point P3 (refer to FIG. 1) of the presentment screen D2 is the same as a placement position of the image R at the end time point of the previous screen D1. Further, the placement position of the image R at the end time point P5 (refer to FIG. 1) of the presentment screen D2 is the same as the placement position of the image R at the end time point of the subsequent screen D3.

Movement Condition Setting Section

The movement condition setting section 35 executes processing of setting the movement condition in a case where the image R is moved within the presentment screen D2. Specifically, the movement condition setting section 35 sets the movement period (second period T2), the movement direction, a moving distance, a movement speed, a movement method, and the like in a case of moving the image R. The movement condition may be set on the basis of, for example, the input of the user. Hereinafter, each item of the movement condition will be described.

Movement Period

The movement period means the second period T2 described above. The second period T2 is set in accordance with the first period T1 in which the acceleration is input. A length of the second period T2 may be, for example, the same as a length of the first period T1 or may be different from the length of the first period T1. The second period T2 may be obtained by adding a predetermined period to the first period T1, or may be obtained by multiplying the first period T1 by a predetermined coefficient.

The second period T2 is set to end at least after the end time point P4 of the first period T1, as shown in FIG. 1. In other words, the period G2 from the end time point P4 of the first period T1 to the end time point P5 of the second period T2 is set. The period G2 is set in accordance with the length of the first period T1. Specifically, the period G2 may have, for example, the same length as that of the first period T1 or the length different from that of the first period T1. In a case where the period G2 is different from the first period T1, for example, the period G2 may be set by multiplying the length of the first period T1 by a predetermined coefficient. It should be noted that the predetermined coefficient may vary depending on the length of the first period T1. That is, it is assumed that the first period T1 in which the acceleration is input is lengthened in a case where the user wants to enjoy the presentment on the presentment screen D2 for a long time. Correspondingly, a larger value of the predetermined coefficient may be set as the first period T1 is longer.

Further, the second period T2 is set to start after the start time point P2 of the first period T1. In other words, the period G2 from the start time point P2 of the first period T1 to the end time point P5 of the second period T2 is set.

It should be noted that the second period T2 may be set to start at the same time as the start time point P2 of the first period T1.

Further, the second period T2 is set so as to overlap with at least a part of the first period T1. In the example shown in FIG. 1, "a part of the period" is a period excluding the period G1. It should be noted that the second period T2 does not have to overlap with the first period T1. In such a case, the second period T2 is set such that the start time point P3 of the second period T2 is positioned after the end time point P4 of the first period T1.

Movement Direction

The movement direction is a direction in which the image R during the second period T2 is moved. The movement direction is set in accordance with the direction of the input acceleration. The movement direction may be set to be the same direction as the direction of the acceleration. Specifically, the movement direction is set to the horizontal direction of the presentment screen D2 in a case where the acceleration in the horizontal direction of the screen of the user terminal 100 is input. It should be noted that the movement direction and the direction of the acceleration may be different from each other. For example, the movement direction may be set to a larger direction (either the vertical direction or the horizontal direction) in a case where the acceleration components in the vertical direction and the horizontal direction of the screen of the user terminal 100 are compared.

The movement direction is set to be changed after a predetermined position is reached. The predetermined position is a predetermined position on the outer frame E which surrounds the presentment screen D2, as shown in FIG. 1. Specifically, the movement direction is set such that the image R moves in a direction away from the predetermined position after the image R moves toward the predetermined position on the presentment screen D2 and reaches the predetermined position. Consequently, the movement direction is changed from a direction from the inside of the presentment screen D2 toward the outer frame E to a direction from the outer frame E toward the inside of the presentment screen D2. In other words, on the presentment screen D2, presentment is performed such that the image R bounces up at the predetermined position.

The movement direction may be set in accordance with an inclined angle of the user terminal 100 with respect to the horizontal direction. The inclined angle is calculated on the basis of the input of the acceleration due to the posture of the user terminal 100. The "inclined angle" is an angle of the front face of the user terminal 100, on which the presentment screen D2 is formed, with respect to the horizontal direction. The movement direction may be set such that the effect of the acceleration component toward the lower side of the presentment screen D2 is larger as the inclination angle is larger and the effect of the acceleration component toward the lower side of the presentment screen D2 is smaller as the inclination angle is smaller. Here, the effect of the acceleration component toward the lower side means, for example, that the acceleration component toward the lower side is added to the movement direction of the image R by an amount corresponding to the magnitude of the inclined angle. Thereby, presentment is performed such that the image R is as if moved on the presentment screen D2 by being affected by the gravity.

Moving Distance

The moving distance may be set in accordance with a magnitude of the input acceleration. For example, the moving distance may be increased as the acceleration is increased. Further, the moving distance may be set in accordance with a display size of the image R on the presentment screen D2. For example, the moving distance may be shortened as the display size of the image R is increased, and the moving distance may be increased as the display size of the image R is decreased. Accordingly, in a case where the plurality of images R having different display sizes are placed on the presentment screen D2, the moving distance of each image R may be set to be different in accordance with the display size.

It should be noted that the moving distance of the image R in a case where the magnitude of the acceleration is greater than a set value may be set to become less than the moving distance of the image R in a case where the magnitude of the acceleration is less than or equal to the set value. Consequently, in a case where the acceleration is high, instead of the original operation, an operation, in which the image R looks as if having slipped, may be performed, and presentment of shortening the moving distance correspondingly may be performed.

Movement Speed

The movement speed may be set in accordance with the magnitude of the input acceleration. For example, the movement speed may be made higher as the acceleration is larger. Further, the movement speed may be set in accordance with the display size of the image R on the presentment screen D2. For example, the movement speed may be reduced as the display size of the image R is increased, and the moving distance may be increased as the display size of the image R is decreased. Accordingly, in a case where a plurality of images R having different display sizes are placed on the presentment screen D2, the movement speed of each image R may be set to be different in accordance with the display size.

Movement Method

There are two main types of movement methods. Specifically, during the second period T2, in some cases, the image R may be continuously moved without being stopped, and the image R may be intermittently moved by repeating movement and stop. Any movement method is set as the movement method.

The following should be noted. In a case where the image R is intermittently moved, the movement condition setting section 35 may set the number of times of movement at a time of intermittently moving the image R during the second period T2 in accordance with the number of inputs of the acceleration which is input during the first period T1. Regarding the "number of inputs of acceleration", for example, the input of the acceleration, which corresponds to one reciprocation of the reciprocating operation of shaking the user terminal 100 in the reciprocation direction, may be counted as one input. Alternatively, a half of one reciprocation, that is, the input of the acceleration corresponding to one operation in the forward direction or the backward direction may be counted as one input. It should be noted that the number of times of the movement of the image R may be the same as or different from the number of inputs of the acceleration. In a case where the number of times of movement is different from the number of inputs, for example, the number of inputs of the acceleration may be multiplied by a predetermined coefficient. The predetermined coefficient may be different depending on a length of the number of inputs. Specifically, it is assumed that the user increases the number of inputs of the acceleration in a case where the user wants to enjoy the presentment on the presentment screen D2 for a long time. Accordingly, as the predetermined coefficient, such a larger value that the number of inputs of the acceleration is larger may be set.

Placement Condition Setting Section

The placement condition setting section 36 executes processing of setting a placement condition in a case where the image R is placed on the screen of the user terminal 100. The placement condition may be set on the basis of the input of the user, for example. The placement condition setting section 36 sets placement conditions in a case where the plurality of images R are placed on each of the previous screen D1 and the subsequent screen D3.

Regarding Previous Screen

The placement condition setting section 36 sets a placement condition of the image R on the previous screen D1. As the placement condition, a condition for randomly placing the image group on the previous screen D1 may be set. As described above, the term "randomly" means a state where the images R constituting the image group are irregularly placed.

Figure 4:
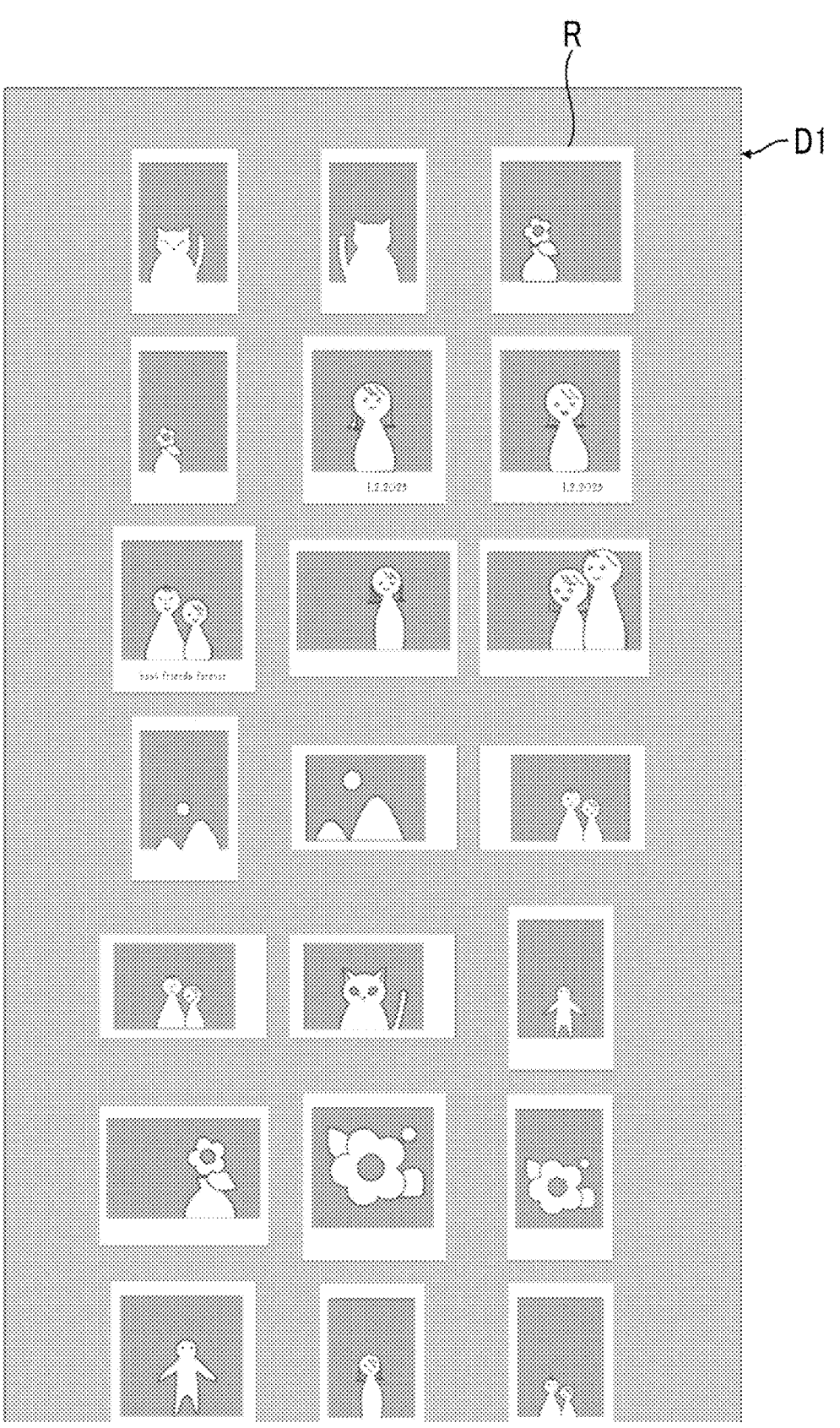
FIG. 4 is a diagram showing an example of a screen of the image display device according to the embodiment of the present invention.
Figure 5:
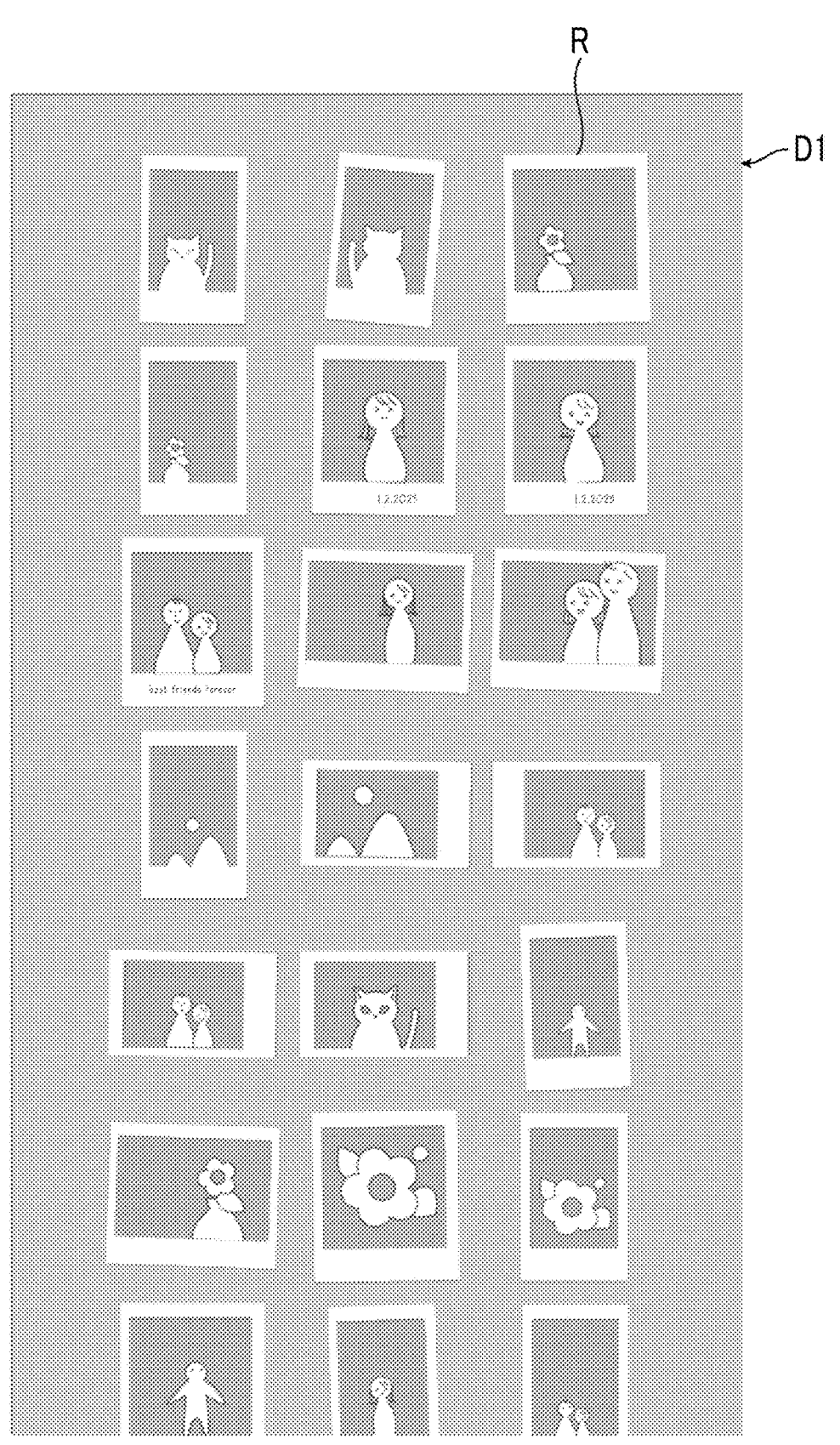
FIG. 5 is a diagram showing an example of a screen of the image display device according to the embodiment of the present invention.
Figure 6:
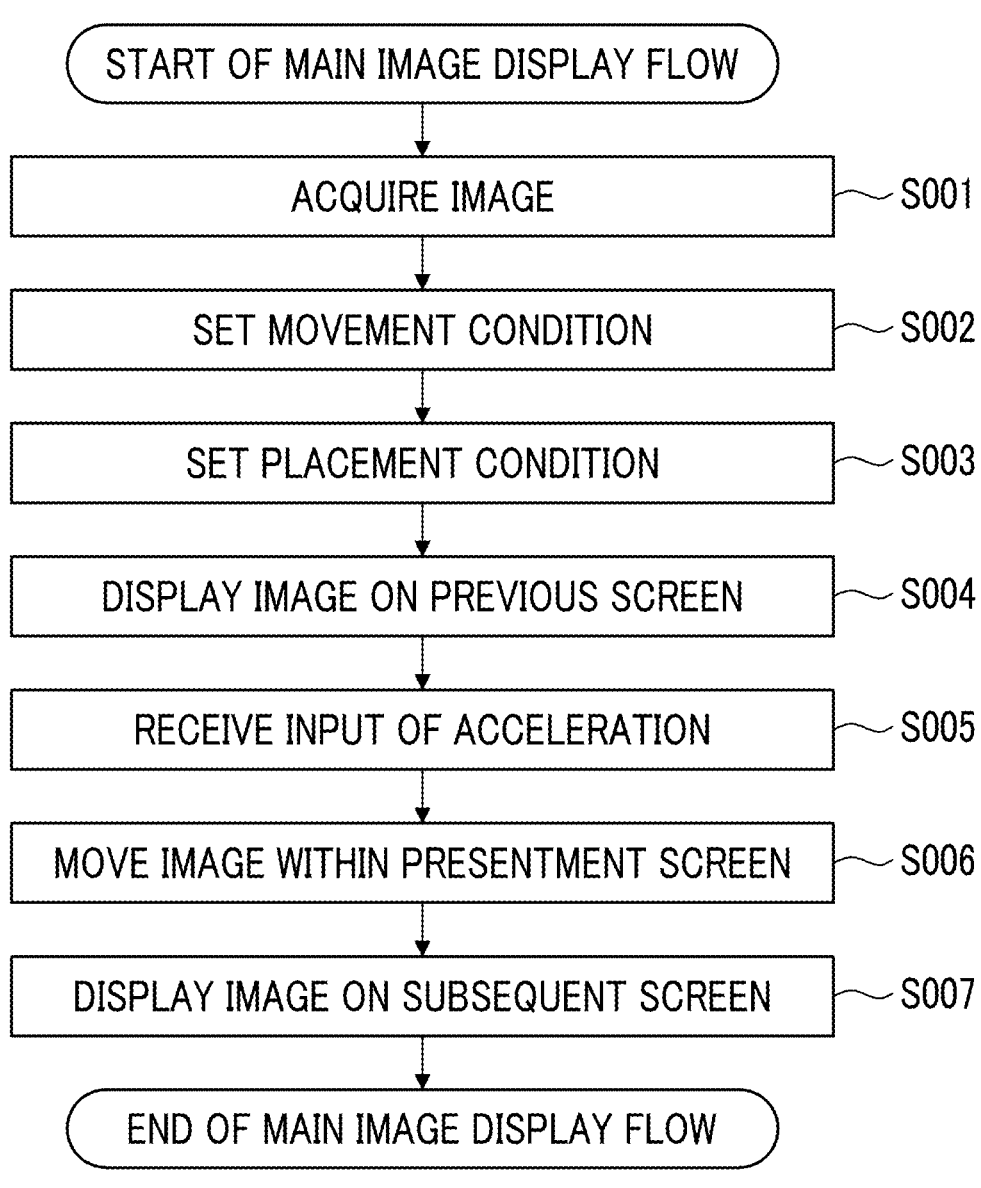
FIG. 6 is a diagram showing a procedure of the main image display flow.

Alternatively, a condition for regularly placing the image group on the previous screen D1 may be set as the placement condition. The term "regularly placed" means determining a placement position of each of the plurality of images on the basis of a certain rule. For example, as shown in FIGS. 4 and 5, the term "regularly placed" corresponds to a case where the plurality of images R are placed in a matrix shape (lattice shape) or a case where the plurality of images R are placed on the basis of certain rules such as a circular shape, a rectangular shape, and a column shape.

Regarding Subsequent Screen

The placement condition setting section 36 sets a placement condition of the image R on the subsequent screen D3.

As the placement condition, a condition for randomly placing the image group on the subsequent screen D3 may be set, similarly to the previous screen D1. Further, as the placement condition, a condition for regularly placing the image group on the subsequent screen D3 may be set.

Further, as the placement condition, a condition for placing each of the plurality of images R along the first placement shape corresponding to the analysis information may be set on the basis of the analysis information of the images R. In such a case, the placement condition setting section 36 executes, as preprocessing, processing of performing image analysis on each of the plurality of images R using a well-known image analysis technique. Thereby, for example, a subject included in each of the plurality of images R is specified. The "subject" is a person, an object, a background, or the like in the image R. However, in the following description, for example, the "subject" is a subject having the highest frequency in the plurality of images R. The subject is associated with the first placement shape by, for example, a preset look-up table or the like. For example, in a case where a male-to-female couple is specified as the subject, a heart shape, in which the male and the female are associated on the basis of the lookup table, may be set as the first placement shape. Thereby, the plurality of images R are placed along the heart shape in the subsequent screen D3.

Further, as the placement condition, a condition for placing each of the plurality of images R along a placement shape (corresponding to the third placement shape) corresponding to the accessory information may be set, on the basis of the accessory information acquired from the image R. In such a case, the placement condition setting section 36 executes, as the preprocessing, processing of acquiring the accessory information associated with each of the plurality of images R. For example, the placement condition setting section 36 extracts a placement shape corresponding to the accessory information from the lookup table, and sets the placement shape corresponding to the accessory information.

Further, a condition for placing each of the plurality of images R along a placement shape (corresponding to the fourth placement shape) corresponding to the input information which is input by the user may be set as the placement condition. In such a case, the placement condition setting section 36 executes, as preprocessing, processing of receiving input information which is input by the user. For example, the placement condition setting section 36 specifies a placement shape corresponding to the input information which is input by the user from the lookup table, and sets the placement shape as a placement shape corresponding to the input information which is input by the user.

Further, as the placement condition, a condition for placing each of the plurality of images R may be set such that the first images, which exceed the first reference value relating to the degree of similarity, among the plurality of images R are close to each other. In such a case, the placement condition setting section 36 may further execute, as preprocessing, processing of performing the image analysis on each of the plurality of images R, and calculation processing of calculating the degree of similarity of each of the plurality of images R on the basis of the analysis information of the images R.

The following should be noted. The processor 21 calculates the degree of similarity for each of the plurality of images R on the basis of the analysis information of the images R, but the present invention is not limited thereto. For example, the processor 21 may calculate the degree of similarity between the plurality of images R on the basis of the accessory information of the images R, the input information which is input by the user, or the other information. Further, processing of extracting a feature amount of each of the plurality of images R may be performed using the well-known image analysis technique, and the degree of similarity of each of the plurality of images R may be calculated on the basis of the feature amounts. For example, the placement condition is set such that the similar images R are close to each other for each category such as color, imaging scene (party, traveling, daily life, and the like), and subject (person, object, landscape).

Regarding Relationship Between Previous Screen and Subsequent Screen

The placement condition setting section 36 may set a relationship between the placement conditions of the previous screen D1 and the subsequent screen D3.

Specifically, the placement condition setting section 36 may set placement conditions for the plurality of images R on each screen such that the plurality of images R are randomly placed on the previous screen D1 and the plurality of images R are regularly placed on the subsequent screen D3. Alternatively, the placement condition setting section 36 may set placement conditions for the plurality of images R on each screen such that such that the plurality of images R are regularly placed on the previous screen D1 and the plurality of images R are randomly placed on the subsequent screen D3.

Further, the placement condition setting section 36 may set such that a positional relationship of the display layer between the images R on the previous screen D1 is changed on the subsequent screen D3. More specifically, in the images R in which the display layers are adjacent to each other, the display layer of the image R placed at the upper position on the previous screen D1 may be placed at the lower position on the subsequent screen D3, and the display layer of the image R placed at the lower position on the previous screen D1 may be placed at an upper position on the subsequent screen D3.

Regarding Image Display Flow According to One Embodiment of Present Invention

Next, the main image display flow, which is a data processing flow using the above-mentioned image display device 10, will be described. The main image display flow adopts the image display method according to the embodiment of the present invention and proceeds in accordance with the flow shown in FIG. 5. That is, each step in the flow shown in FIG. 5 corresponds to each element constituting the image display method according to the embodiment of the present invention.

It should be noted that the flow shown in FIG. 5 is merely an example, and an unnecessary step may be deleted or a new step may be added within a scope not departing from the gist of the present invention.

The main image display flow is started by using activation of the image display application installed in the user terminal 100 as a trigger.

First, the processor 21 executes the acquisition processing of acquiring one or a plurality of images R used for presentment of the main image display from the image group (S001). The "image group" is, for example, an image group which is stored in the storage device 24 or an image group that is saved in the cloud-type server (not shown in the drawing) and that is associated with the user information.

Next, the processor 21 executes processing of setting the movement condition in a case where the image R is moved within the presentment screen D2 (S002). Specifically, the processor 21 sets the movement period (second period T2), the movement direction, the moving distance, the movement speed, and the movement method in a case of moving the image R.

Next, the processor 21 executes processing of setting the placement condition in a case where the image R is placed on the screen of the user terminal 100 (S003). More specifically, the processor 21 sets the placement condition in a case where the image R is placed on each of the previous screen D1 and the subsequent screen D3. As the placement condition, as described above, the conditions for the placement shape of the image R, the degree of similarity between the images R, and the positional relationship of the display layer between the images R are respectively set.

Next, the processor 21 executes the display processing of displaying one or the plurality of images R on the previous screen D1 of the user terminal 100 (S004). Specifically, the processor 21 executes processing of displaying the image R on the previous screen D1 on the basis of the placement condition which is set in step S003.

Next, the processor 21 executes the reception processing of receiving the input of the acceleration to the user terminal 100 (S005). More specifically, in a case where the user shakes the user terminal 100 and inputs an acceleration to the user terminal 100, the processor 21 receives an output signal which is output from the sensor 25 in accordance with the acceleration.

Next, after receiving the input of the acceleration, the processor 21 switches the screen of the user terminal 100 from the previous screen D1 to the presentment screen D2 through the period G1. The processor 21 executes the movement processing of moving the image R within the presentment screen D2 in accordance with the direction of the input acceleration during the second period T2 corresponding to the first period T1 in which the acceleration is input (S006). The processor 21 moves the image R within the presentment screen D2 on the basis of the movement condition which is set in step S002. The processor 21 ends the second period T2 after the end time point P4 at which the first period T1 ends.

Next, in a case where the second period T2 ends, the processor 21 switches the screen of the user terminal 100 from the presentment screen D2 to the subsequent screen D3. The processor 21 executes the display processing of displaying one or the plurality of images R on the subsequent screen D3 of the user terminal 100 (S007). Specifically, the processor 21 executes processing of displaying the image R on the subsequent screen D3 on the basis of the placement condition which is set in step S003.

The main image display flow ends immediately at a time point at which the series of processing hitherto described end.

Regarding Efficacy of One Embodiment of Present Invention

In the image display device 10, the second period T2, in which the presentment is performed on the presentment screen D2, ends after the end time point P4 of the first period T1 in which the acceleration is input. Thereby, the user is able to enjoy the presentment on the presentment screen D2 during the period G2 between the end time point P4 of the first period T1 and the end time point P5 of the second period T2. That is, even after the user ends the shake of the user terminal 100, the user is able to enjoy the presentment in which the image R moves due to inertia (vis inertiae) as afterglow.

Since the image R moves within the presentment screen D2 in accordance with the direction of the input acceleration, the user is able to easily change the placement position of the image R on the screen of the user terminal 100.

As described above, according to the image display device 10, it is possible to easily change the placement position of the image R in the screen while performing presentment that entertains the user.

Further, the processor 21 executes the movement processing such that the second period T2 starts after the start time point P2 of the first period T1.

Thereby, the end time point P5 of the second period T2 is likely to be positioned after the end time point P4 of the first period T1. As a result, the period G2 is ensured, and the user is able to enjoy the presentment on the presentment screen D2.

Further, the processor 21 causes the second period T2 to overlap with at least a part of the first period T1.

Thereby, the presentment using the presentment screen D2 has already been performed at the end time point P4 of the first period T1. Therefore, the user is able to smoothly enjoy the presentment using the presentment screen D2 from the end time point P4 of the first period T1.

The processor 21 executes the movement processing such that the image R is moved in a direction away from the predetermined position after the image R is moved toward the predetermined position on the presentment screen D2 and reaches the predetermined position.

Thereby, it is possible to perform the animation presentment in which the image R reaches the predetermined position on the outer frame E of the presentment screen D2 such that the movement direction thereof is changed. Consequently, the user is able to enjoy presentment in which the image R reciprocates in a space surrounded by the outer frame E while bouncing up on the outer frame E.

Further, the processor 21 sets the length of the second period T2 in accordance with the length of the first period T1.

Thereby, the length of the period, in which the above-mentioned presentment of the image movement is executed, is determined in accordance with the time during which the input operation of the acceleration is performed by the user. Therefore, the user is able to enjoy the above-mentioned presentment, for a time which is desired by the user.

Further, the processor 21 sets the number of times of movement in a case where the image is intermittently moved during the second period T2, in accordance with the number of inputs of the input acceleration during the first period T1.

Thereby, the above-mentioned presentment of the image movement is executed in accordance with the number of the input operations of the acceleration which is input by the user. Therefore, the user is able to enjoy the above-mentioned presentment, the number of times which is desired by the user.

Further, the processor 21 sets the movement direction in which the image R of the second period T2 is moved, in accordance with the inclined angle of the user terminal 100 with respect to the horizontal direction. The inclined angle is calculated on the basis of the input of the acceleration.

Thereby, presentment is performed such that the image R is moved on the presentment screen D2 in accordance with the posture of the user terminal 100 in a case where the user holds the user terminal 100. Therefore, the user is able to enjoy the above-mentioned presentment while changing the movement mode (for example, the movement speed) of the image R by changing the posture of the user terminal 100.

Further, the processor 21 sets the movement condition in a case of moving the image R in accordance with the magnitude of the acceleration.

Thereby, the above-mentioned presentment of the image movement is executed in accordance with the magnitude of the input acceleration in the input operation of the acceleration which is input by the user. Therefore, the user is able to enjoy the above-mentioned presentment while changing the movement conditions of the image R.

Further, the processor 21 decreases the moving distance of the image in a case where the magnitude of the acceleration is greater than the set value, as compared with the moving distance of the image in a case where the magnitude of the acceleration is equal to or less than the set value.

Thereby, the above-mentioned presentment of the image movement is executed in accordance with the magnitude relationship between the magnitude of the input acceleration in the input operation of the acceleration which is input by the user and the threshold value. Therefore, the user is able to enjoy the above-mentioned presentment in a mode based on the above-mentioned magnitude relationship.

In the display processing, the processor 21 displays the plurality of images R on the previous screen D1 of the user terminal 100, and executes processing of performing image analysis on each of the plurality of images R. Further, in the movement processing, each of the plurality of images R is moved on the basis of the analysis information of the images R such that each of the plurality of images R is placed along the first placement shape corresponding to the analysis information.

Thereby, the user is able to enjoy the presentment on the subsequent screen D3, that is, the presentment in which each of the plurality of images R is placed along the first placement shape. Further, the first placement shape is determined on the basis of the analysis results of the images R. Thereby, the user is able to enjoy the amusingness based on the placement shape by viewing the plurality of images R placed in a shape corresponding to the content of the image R.

In the display processing, the processor 21 executes the processing of displaying the plurality of images R in the previous screen D1 of the user terminal 100 and acquiring the accessory information associated with each of the plurality of images R. Furthermore, in the movement processing, on the basis of the acquired accessory information, each of the plurality of images R may be moved such that the plurality of images R are placed along the third placement shape corresponding to the accessory information.

Thereby, the user is able to enjoy the presentment on the subsequent screen D3, that is, the presentment in which each of the plurality of images R is placed along the third placement shape. Further, the third placement shape is determined on the basis of the accessory information of the images R (specifically, the imaging date and time, the imaging location, or the like). Thereby, the user is able to enjoy the amusingness based on the placement shape by viewing the plurality of images R placed in a shape corresponding to the accessory information of the image R.

In the display processing, the processor 21 displays the plurality of images R on the previous screen D1 of the user terminal 100 and executes processing of receiving the input information which is input by the user. Further, in the movement processing, each of the plurality of images R is moved such that each of the plurality of images R is placed along the fourth placement shape corresponding to the input information.

Thereby, the user is able to enjoy the presentment on the subsequent screen D3, that is, the presentment in which each of the plurality of images R is placed along the fourth placement shape. Further, the fourth placement shape is determined on the basis of the information which is input by the user. Thereby, the user is able to enjoy the amusingness based on the placement shape by viewing the plurality of images R placed in a desired shape of the user.

Further, the processor 21 further executes processing of performing the image analysis on each of the plurality of images R. Further, the processor 21 further executes calculation processing of calculating a degree of similarity of each of the plurality of images R, on the basis of the analysis information of the images R. In the movement processing, the processor 21 moves the plurality of images R such that the first images, which exceed the first reference value relating to the degree of similarity, among the plurality of images R are close to each other.

More specifically, in the display processing, the processor 21 displays the plurality of images R in the previous screen D1 of user terminal 100, and executes calculation processing of calculating the degree of similarity of each of the plurality of images R on the basis of the feature amount of each of the plurality of images R. Further, in the movement processing, the plurality of images R are moved such that the first images, which exceed the first reference value relating to the degree of similarity, among the plurality of images R are close to each other.

Alternatively, the processor 21 further executes processing of acquiring the accessory information associated with each of the plurality of images R. The processor 21 further executes calculation processing of calculating the degree of similarity of each of the plurality of images R, on the basis of the acquired accessory information. In the movement processing, the processor 21 moves the plurality of images R such that the first images, which exceed the first reference value relating to the degree of similarity, among the plurality of images R are close to each other.

Alternatively, the processor 21 further executes processing of receiving the input information which is input by the user. The processor 21 further executes calculation processing of calculating the degree of similarity of each of the plurality of images R, on the basis of the input information. In the movement processing, the processor 21 moves the plurality of images R such that the first images, which exceed the first reference value relating to the degree of similarity, among the plurality of images R are close to each other.

Thereby, the user is able to enjoy the presentment in which the first images similar to each other are placed close to each other on the subsequent screen D3 even after the presentment on the presentment screen D2 ends.

Further, the processor 21 may display the plurality of images R on the previous screen D1 and the subsequent screen D3 such that the plurality of images R are placed in a random manner in the display processing. Furthermore, the processor 21 may display the plurality of images R on the previous screen D1 and the subsequent screen D3 such that the plurality of images R are placed in a regular manner in the display processing.

Thereby, the plurality of images R can be placed in a regular manner or a random manner on the previous screen D1 and the subsequent screen D3. Therefore, the user is able to enjoy the presentment on the previous screen D1 and the subsequent screen D3. In other words, the user is able to enjoy a sense of unity due to the image group which is displayed on the subsequent screen D3.

Further, the processor 21 displays the plurality of images R placed in one of the regular manner and the random manner in the screen in the display processing, and receives an input of the acceleration in the reception processing. In such a case, in the movement processing, each of the plurality of images R is moved such that the plurality of images R are placed in the other of the regular manner and the random manner.

Thereby, the user is able to enjoy each of the different placements of the plurality of images R before and after the presentment performed by the presentment screen D2. In other words, the user is able to enjoy the difference between the previous screen D1 and the subsequent screen D3 in the placement pattern of the image group.

Further, in a case where the input of the acceleration is received in the reception processing, the processor 21 moves each of the plurality of images R such that the vertically relative positions of the images R are changed.

Thereby, the user is able to enjoy each of the different placements of the plurality of images R before and after the presentment performed by the presentment screen D2. That is, by displaying the image R, which is not displayed on the previous screen D1, on the subsequent screen D3, the user is able to enjoy the difference in the display image before and after the presentment.

Regarding Other Embodiments

In the above-mentioned embodiment, as shown in FIG. 5, after the image R is displayed on the subsequent screen D3, the image display flow ends. However, the present invention is not limited thereto, and the image display flow may be repeatedly executed.

In such a case, the processor 21 may set placement shapes of the images R to be different between an n-th (n is a natural number of 1 or more) subsequent screen and an (n+1)-th subsequent screen.

Thereby, the user is able to enjoy the difference in the placement shapes of the images R whenever the image display flow is repeated.

In the n-th time and the (n+1)-th time, the processor 21 may have a relationship between the placement shapes of the images R of the respective subsequent screens.

For example, in the above-mentioned embodiment, the processor 21 places each of the plurality of images R along the first placement shape corresponding to the analysis information on the basis of the analysis information of the images R. For example, the processor 21 may cause each of the plurality of images R placed along the first placement shape to be placed along the second placement shape having a relationship with the first placement shape, on the basis of the analysis information of the same image R. Consequently, the processor 21 may preset a plurality of placement shapes having a relationship with the specific subject, for example, on the basis of the analysis information of the images R, and may select a placement shape to be displayed on a subsequent screen from the plurality of placement shapes having the relationship whenever the image display flow is repeated.

As described above, the processor 21 may place each of the plurality of images R in accordance with the first placement shape and then receive the input of the acceleration in the reception processing. In such a case, in the movement processing, each of the plurality of images R may be moved on the basis of the analysis information such that each of the plurality of images R placed along the first placement shape is placed along the second placement shape.

Thereby, the user is able to enjoy the change of the placement shape having the relationship whenever the image display flow is repeated.

The following should be noted. The processor 21 presets the plurality of placement shapes having the relationship on the basis of the analysis information of the images R, but the present invention is not limited thereto. For example, the processor 21 may preset the plurality of placement shapes on the basis of, for example, the accessory information of the images R, the input information which is input by the user, or the other information.

Further, the processor 21 may place the images R each having a high degree of similarity such that the images R are close to each other whenever the image display flow is repeated.

More specifically, in the embodiment, the processor 21 moves the plurality of images R such that the first images, which exceed the first reference value relating to the degree of similarity, among the plurality of images R are close to each other. The processor 21 may place the first images, among the plurality of images R, such that the first images are close to each other, and then may receive the input of the acceleration in the reception processing. In such a case, in the movement processing, on the basis of the second reference value of which the degree of similarity is higher than the first reference value, the plurality of images may be moved such that the second images, which exceed the second reference value, among the plurality of first images are close to each other.

Thereby, the user is able to enjoy the presentment in which the images R each having a high degree of similarity are close to each other whenever the image display flow is repeated.

Further, in the above-mentioned embodiment, the sensor 25 outputs the respective accelerations in the three directions orthogonal to one another. That is, the sensor 25 is able to output the acceleration in a plurality of directions (more specifically, any direction in the three-dimensional space).

For example, the processor may receive each of an input of the first direction and an input of the second direction different from the first direction as the input of the acceleration to the user terminal 100. The processor may execute the movement processing according to the above-mentioned embodiment in a case of receiving the input of the acceleration in the first direction and may execute processing different from the movement processing in a case of receiving the input of the acceleration in the second direction.

The processor is able to execute, as "processing different from movement processing", replacement processing of replacing at least one image R among the plurality of images R displayed on the screen of the user terminal 100 with another image which is not displayed on the screen of the user terminal 100. Further, the processor may execute, as the "processing different from the movement processing", increase-decrease processing of increasing or decreasing the number of the plurality of images R displayed on the screen of the user terminal 100. Furthermore, the processor may execute, as the "processing different from the movement processing", processing obtained by combining the two types of processing, that is, the replacement processing and the increase-decrease processing.

Regarding the "replacement processing", for example, the plurality of image groups may be classified in advance on the basis of a specific condition, and image groups may be replaced among the plurality of image groups whenever the replacement processing is executed. For example, the plurality of image groups classified for each date may be replaced with image groups each having a new (or old) date whenever the replacement processing is executed.

Further, regarding the "increase-decrease processing", for example, a specific image group is preset, and new images may be added to the image group displayed on the user terminal 100 whenever the increase-decrease processing is executed, such that the image group may be brought close to the specific image group. Alternatively, images may be deleted from the image group displayed on the user terminal 100, such that the image group may be brought close to the specific image group.

Furthermore, regarding the "processing in which both are combined", a plurality of image groups different in the number of images may be specified in advance, and may be replaced with image groups each gradually having a larger number of images (or a smaller number of images) whenever the processing is executed.

It should be noted that the processor 21 may receive the input of an acceleration in the third direction different from the acceleration in the first direction and the acceleration in the second direction. In such a case, regarding the "replacement processing", the "increase-decrease processing", and the "processing in which both are combined", the replacement conditions, the increase-decrease conditions, and the like may be different, between a case where the acceleration in the second direction is input and a case where the acceleration in the third direction is input. As a specific example, regarding the replacement processing, the plurality of image groups classified for each date may be replaced with image groups each having a new date in a case where the acceleration in the second direction is input, or may be replaced with image groups each having an old date in a case where the acceleration in the third direction is input. Further, regarding the increase-decrease processing, in a case where the acceleration in the second direction is input, an image may be newly added to the image group displayed on the user terminal 100. Alternatively, in a case where the acceleration in the third direction is input, an image may be deleted from the image group displayed on the user terminal 100.

In the above-mentioned embodiment, the description was given on the premise that the image R is a still image. However, the present invention is not limited thereto, and the image R may be a moving image in which the display content changes over time. Specifically, as shown in FIGS. 7 to 11, the image R may be a moving image that gradually changes in order from the left side of each drawing. The processor 21 changes the image R using the well-known image processing technique, specifically, the animation technique for changing a shade of the image.

Figure 7:
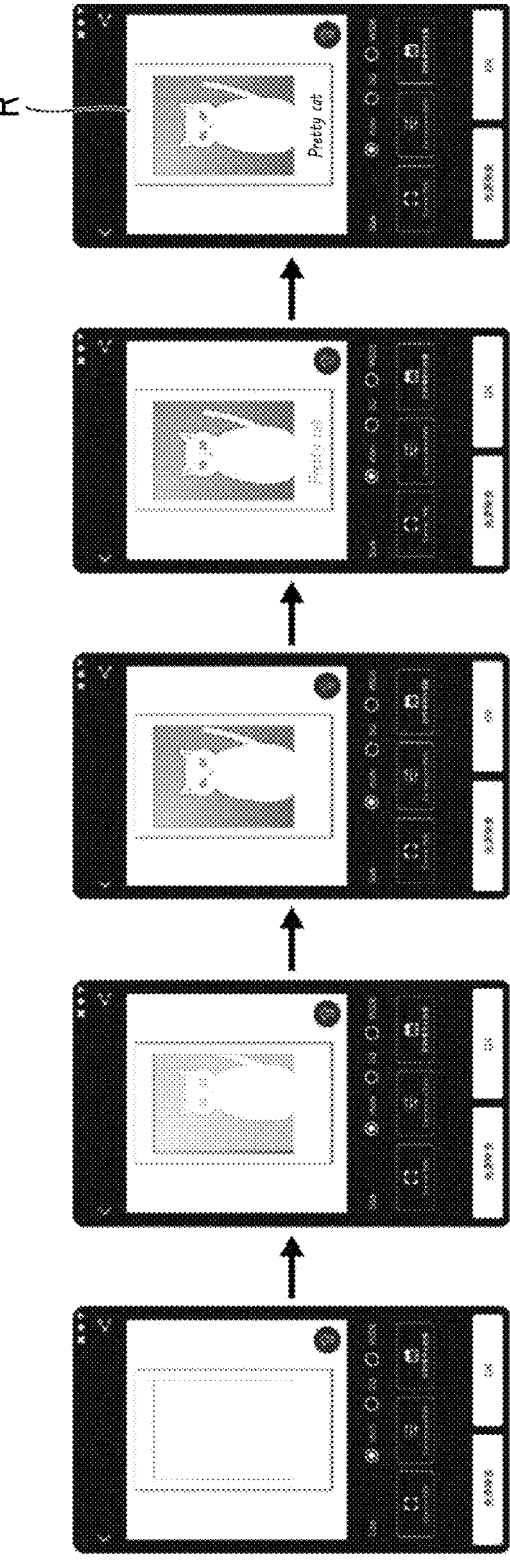
FIG. 7 is a diagram showing an example of transition of an image displayed on a screen of a user terminal.
Figure 8:
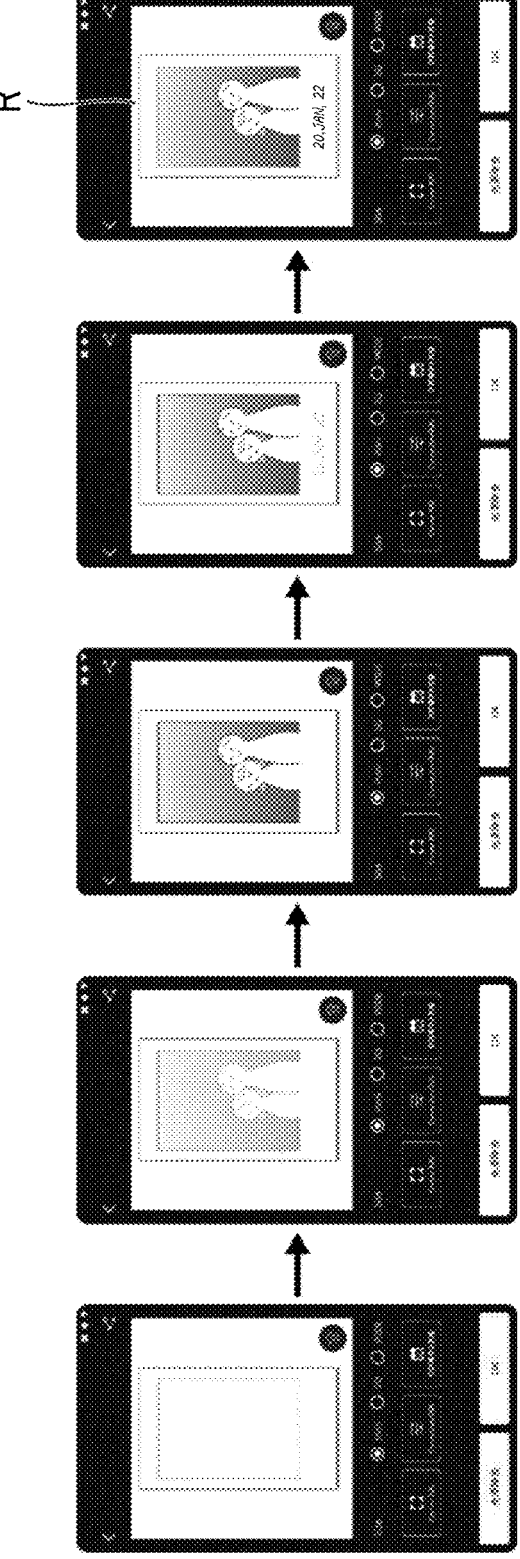
FIG. 8 is a diagram showing an example of transition of an image displayed on the screen of the user terminal.

The images R shown in FIGS. 7 and 8 will be described in more detail.

In the image R (which is first from the left side in FIGS. 7 and 8) which is displayed first, a boundary line, of which an area is smaller than that of the peripheral edge of the image R by one size, is displayed in the image R. An image area in which a subject is not yet captured is displayed in a region closer to the inner side than the boundary line, and a solid frame portion is displayed in a region closer to the outer side than the boundary line.

In the image R (which is second from the left side in FIGS. 7 and 8) which is displayed next, an image area, in which the subject is placed, is displayed in the region closer to the inner side than the boundary line. As in the image R displayed previously, the solid frame portion is displayed in the region closer to the outer side than the boundary line.

In the next displayed image R (which is third from the left side in FIGS. 7 and 8), an image area, in which the subject having a higher density (lower transmittance) than the previous image area is placed, is displayed in a region closer to the inner side than the boundary line. As in the previous image, the solid frame portion is displayed in the region closer to the outer side than the boundary line.

In the next displayed image R (which is fourth from the left side in FIGS. 7 and 8), an image area, which is the same as the previous image area and in which the subject is placed, is displayed in the region closer to the inner side than the boundary line. On the other hand, the frame portion, in which a pattern (specifically, "handwritten text") is placed, is displayed in the region closer to the outer side than the boundary line.

In the next displayed image (which is fifth from the left side in FIGS. 7 and 8), an image area, which is the same as the previous image area and in which the subject is placed, is displayed in the region closer to the inner side than the boundary line. On the other hand, the frame portion, in which a pattern having a higher density (lower transmittance) than the previous frame portion is placed, is displayed in the region closer to the outer side than the boundary line.

As described above, the processor executes the presentment in which the display content in the image R changes over time. Therefore, development of the photographic image obtained by the instant camera, that is, generation of the printed matter on which the photographic image is printed, can be reproduced in an animation image. Thereby, the user is able to obtain an experience as if the actual imaging is performed with the instant camera.

Figure 9:
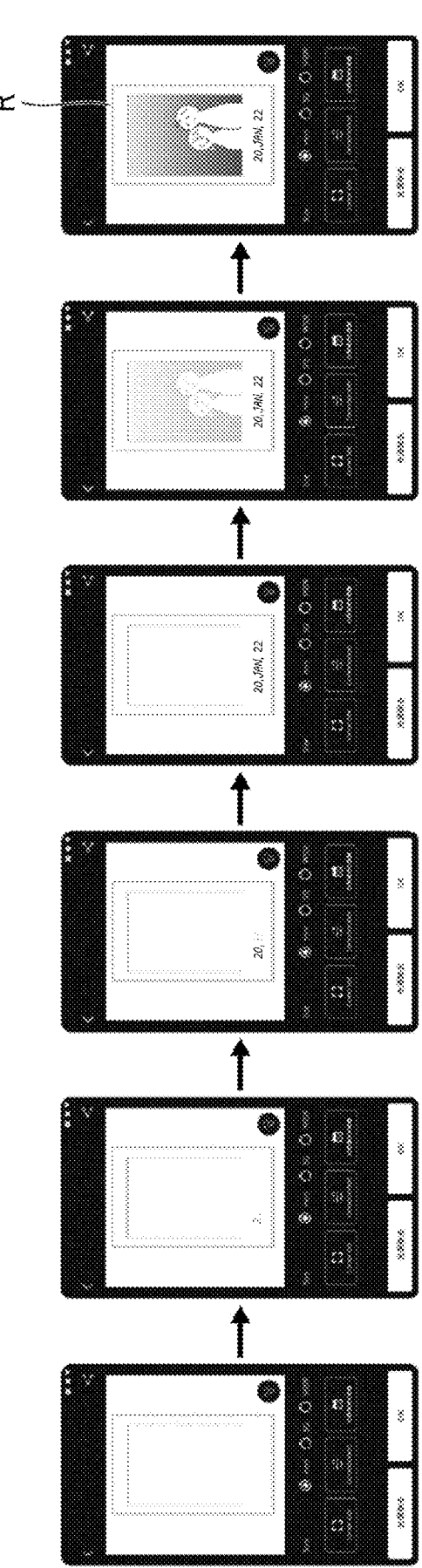
FIG. 9 is a diagram showing an example of transition of an image displayed on the screen of the user terminal.
Figure 10:
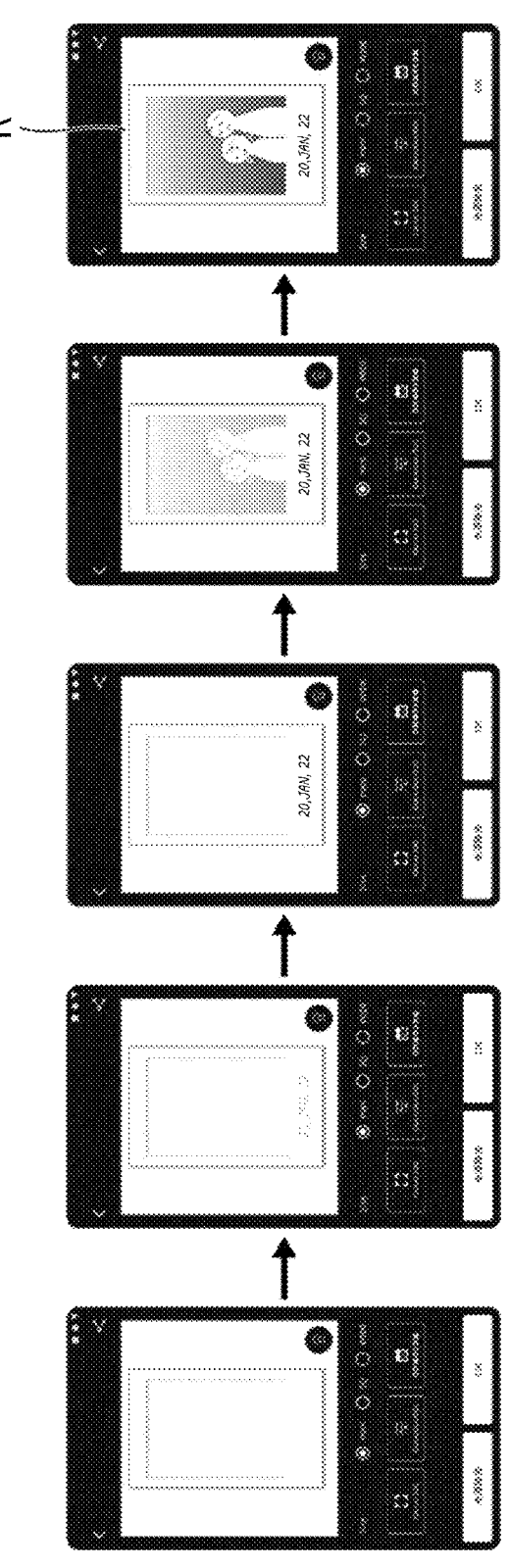
FIG. 10 is a diagram showing an example of transition of an image displayed on the screen of the user terminal.
Figure 11:
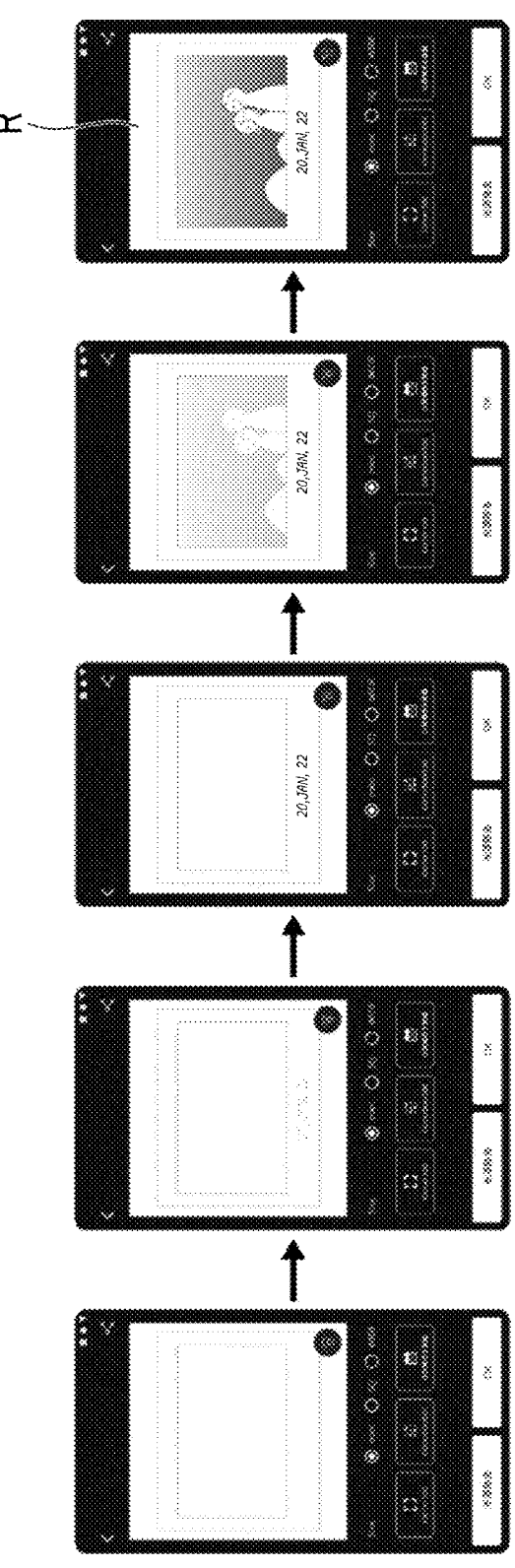
FIG. 11 is a diagram showing an example of transition of an image displayed on the screen of the user terminal.

It should be noted that in the above-mentioned example, the frame portion is changed after the image area is changed. However, the embodiment of the present invention is not limited thereto, and as shown in FIGS. 9 to 11, the image area may be changed after the frame portion is changed. For example, it is possible to appropriately set which of the image area and the frame portion is changed first, on the basis of an input from the user.

In the above-mentioned embodiment, the image display device 10 is configured by using a part of the user terminal 100, but the present invention is not limited thereto. The image display device according to the embodiment of the present invention is an image display device different from the user terminal 100, and may be configured by using, for example, a server computer. Consequently, the user terminal 100 may include an image display device.

The processor provided in the image display device according to the embodiment of the present invention includes various processors. Examples of the various processors include a CPU, which is a general-purpose processor that executes software (program) and functions as various processing sections.

Moreover, various processors include a programmable logic device (PLD), which is a processor of which a circuit configuration can be changed after manufacturing, such as a field programmable gate array (FPGA).

Moreover, the various processors described above also include a dedicated electric circuit, which is a processor having a circuit configuration specially designed for executing a specific processing, such as an application specific integrated circuit (ASIC).

Moreover, one processing section provided in the image display device according to the embodiment of the present invention may be configured by using one of the various processors described above, or may be configured by using a combination of two or more processors of the same type or different types, for example, a combination of a plurality of FPGAs or a combination of an FPGA and a CPU.

Moreover, a plurality of functional sections provided in the image display device according to the embodiment of the present invention may be configured by using one of various processors, or may be configured by using one processor in which two or more of the plurality of functional sections are combined.

Moreover, as in the embodiment described above, a form may be adopted in which one processor is configured by using a combination of one or more CPUs and software, and the processor functions as the plurality of functional sections.

Moreover, for example, as represented by a system on chip (SoC) or the like, a form may be adopted in which a processor is used in which the functions of the whole system which includes the plurality of functional sections in the image display device according to the embodiment of the present invention are realized by a single integrated circuit (IC) chip. Moreover, a hardware configuration of the various processors described above may be an electric circuit (circuitry) in which circuit elements, such as semiconductor elements, are combined.

EXPLANATION OF REFERENCES

10: image display device
21: processor
22: memory

23: communication interface
24: storage device
25: sensor
31: image acquisition section
32: display processing section
32A: first display processing section
32B: second display processing section
33: receiving section
34: movement processing section
35: movement condition setting section
36: placement condition setting section
41: boundary line
100: user terminal
D1: previous screen
D2: presentment screen
D3: subsequent screen
E: outer frame
G1, G2: period
P1, P2, P3: start time point
P4, P5: end time point
R: image
T1: first period
T2: second period

What is claimed is:

1. An image display control device executing:
acquisition processing of acquiring first information about
    a motion of a terminal;
movement processing of moving a display position of an
    image, during a second period corresponding to a first
    period in which second information significant to the
    motion is acquired, on the basis of the acquired second
    information; and
one of replacement processing and increase-decrease pro-
    cessing, the replacement processing replacing the
    image displayed on a screen of the terminal with
    another image which is not displayed on the screen of
    the terminal, and the increase-decrease processing
    increasing or decreasing a number of images displayed
    on the screen of the terminal,
wherein the second period ends after a lapse of a prede-
    termined time from end of the first period,
wherein the first information includes accelerations of the
    terminal in a first direction and a second direction
    different from each other among accelerations of the
    terminal, and
wherein the movement processing is executed when the
    acceleration of the terminal in the first direction is
    acquired as the first information, and one of the replace-
    ment processing and the increase-decrease processing
    is executed when the acceleration of the terminal in the
    second direction is acquired as the first information.

2. The image display control device according to claim 1,
wherein a period, in which the display position of the
    image is moved, is the second period.

3. The image display control device according to claim 1,
wherein the predetermined time is a time after a process-
    ing sequence ends.

4. The image display control device according to claim 1,
wherein the movement processing is executed such that
    the second period starts after a start time point of the
    first period.

5. The image display control device according to claim 1,
wherein the second period overlaps with at least a part of
    the first period.

6. The image display control device according to claim 1,
wherein a form of the movement processing is changed on
    the basis of the first information.

7. The image display control device according to claim 1,
wherein the movement processing is executed such that
    the image is moved in a direction away from a prede-
    termined position after the image is moved toward the
    predetermined position on a screen and reaches the
    predetermined position.

8. The image display control device according to claim 1,
wherein a length of the second period is set on the basis
    of the first information.

9. The image display control device according to claim 1,
wherein a length of the second period is set in accordance
    with a length of the first period.

10. The image display control device according to claim
1,
wherein the number of times of movement in a case where
    the image is intermittently moved during the second
    period is set in accordance with the number of inputs of
    the first information which is input during the first
    period.

11. The image display control device according to claim
1,
wherein a movement direction, in which the image is
    moved during the second period, is set in accordance
    with an inclined angle of the terminal with respect to a
    horizontal direction, where the inclined angle is calcu-
    lated on the basis of input of the first information
    depending on a posture of the terminal.

12. The image display control device according to claim
1,
wherein a movement condition in a case of moving the
    image is set in accordance with a size of the first
    information.

13. The image display control device according to claim
1,
wherein a moving distance of the image in a case where
    a size of the first information is greater than a set value
    is reduced to be less than a moving distance of the
    image in a case where the size of the first information
    is equal to or less than the set value.

14. The image display control device according to claim
1, further executing:
processing of performing image analysis on a plurality of
    images,
wherein in the movement processing, on the basis of
    analysis information of the images, each of the plurality
    of images is moved such that each of the plurality of
    images is placed along a first placement shape corre-
    sponding to the analysis information.

15. The image display control device according to claim
14,
wherein after each of the plurality of images is placed
    along the first placement shape, in a case where input
    of the first information is received in the acquisition
    processing,
    in the movement processing, on the basis of the analy-
        sis information, each of the plurality of images is
        moved such that each of the plurality of images
        placed along the first placement shape is placed
        along a second placement shape.

16. The image display control device according to claim
1, further executing:
processing of acquiring accessory information associated
    with each of a plurality of images,
wherein in the movement processing, on the basis of the
    acquired accessory information, each of the plurality of
    images is moved such that each of the plurality of images is placed along a third placement shape corresponding to the accessory information.

17. The image display control device according to claim 1, further executing:

processing of receiving input information of a user, wherein, in the movement processing, each of a plurality of images is moved such that each of the plurality of images is placed along a fourth placement shape corresponding to the input information.

18. The image display control device according to claim 1, further executing:

processing of performing image analysis on each of a plurality of images; and calculation processing of calculating a degree of similarity of each of the plurality of images on the basis of analysis information of the image, wherein in the movement processing, the plurality of images are moved such that first images exceeding a first reference value relating to the degree of similarity among the plurality of images are close to each other.

19. The image display control device according to claim 18, wherein in a case where input of the first information is received after the first images among the plurality of images are placed close to each other, in the movement processing, on the basis of a second reference value of which the degree of similarity is higher than the first reference value, the plurality of images are moved such that second images exceeding the second reference value among the plurality of first images are further close to each other.

20. The image display control device according to claim 1, further executing:

processing of acquiring accessory information associated with each of a plurality of images; and calculation processing of calculating a degree of similarity of each of the plurality of images on the basis of the acquired accessory information, wherein in the movement processing, the plurality of images are moved such that first images exceeding a first reference value relating to the degree of similarity among the plurality of images are close to each other.

21. The image display control device according to claim 1, further executing:

processing of receiving input information of a user; and calculation processing of calculating a degree of similarity of each of a plurality of images on the basis of the input information, wherein in the movement processing, the plurality of images are moved such that first images exceeding a first reference value relating to the degree of similarity among the plurality of images are close to each other.

22. The image display control device according to claim 1, wherein a plurality of images are displayed to be placed in a random manner in a screen.

23. The image display control device according to claim 1, wherein a plurality of images are displayed to be placed in a regular manner in a screen.

24. The image display control device according to claim 1, further executing:

display processing of displaying a plurality of images placed in one of a regular manner or a random manner in a screen, wherein in a case where input of the first information is received in the acquisition processing, in the movement processing, each of the plurality of images is moved such that the plurality of images are placed in the other of the regular manner or the random manner.

25. The image display control device according to claim 1, wherein in a case where input of the first information is received, each of a plurality of images is moved such that vertically relative positions of the images are changed.

26. A terminal comprising:

the image display control device according to claim 1.

27. An image display method causing a processor to execute:

acquisition processing of acquiring first information about a motion of a terminal;

movement processing of moving a display position of an image, during a second period corresponding to a first period in which second information significant to the motion is acquired, on the basis of the acquired second information; and one of replacement processing and increase-decrease processing, the replacement processing replacing the image displayed on a screen of the terminal with another image which is not displayed on the screen of the terminal, and the increase-decrease processing increasing or decreasing a number of images displayed on the screen of the terminal, wherein the second period ends after a lapse of a predetermined time from end of the first period, wherein the first information includes accelerations of the terminal in a first direction and a second direction different from each other among accelerations of the terminal, and wherein the movement processing is executed when the acceleration of the terminal in the first direction is acquired as the first information, and one of the replacement processing and the increase-decrease processing is executed when the acceleration of the terminal in the second direction is acquired as the first information.

28. A computer-readable storage medium storing:

a program that causes a computer to execute each processing included in the image display method according to claim 27.

* * * * *